(12) United States Patent
Jaiswal et al.

(10) Patent No.: US 12,481,564 B2
(45) Date of Patent: Nov. 25, 2025

(54) METHOD AND SYSTEM FOR PREVENTING SERVICE LEVEL AGREEMENT VIOLATIONS IN BACKUP-AS-A-SERVICE

(71) Applicant: HITACHI, Ltd., Tokyo (JP)

(72) Inventors: Satish Kumar Jaiswal, Santa Clara, CA (US); Kazuei Hironaka, Campbell, CA (US); Ryosuke Tatsumi, Sunnyvale, CA (US); Hiroyuki Osaki, Los Gatos, CA (US)

(73) Assignee: HITACHI VANTARA, LTD., Yokohama (JP)

( * ) Notice: Subject to any disclaimer, the term of this patent is extended or adjusted under 35 U.S.C. 154(b) by 7 days.

(21) Appl. No.: 18/592,126

(22) Filed: Feb. 29, 2024

(65) Prior Publication Data

US 2025/0278337 A1    Sep. 4, 2025

(51) Int. Cl.
G06F 12/00 (2006.01)
G06F 11/14 (2006.01)
H04L 41/5009 (2022.01)

(52) U.S. Cl.
CPC ...... *G06F 11/1464* (2013.01); *H04L 41/5009* (2013.01)

(58) Field of Classification Search
None
See application file for complete search history.

(56) References Cited

U.S. PATENT DOCUMENTS

| 11,321,181 | B2 | 5/2022 | Kottomtharayil | |
| 2021/0117287 | A1* | 4/2021 | Zhang | H04L 41/5006 |
| 2024/0202078 | A1* | 6/2024 | Ur Rahman | G06N 20/00 |

* cited by examiner

Primary Examiner — Daniel D Tsui
(74) Attorney, Agent, or Firm — Procopio, Cory, Hargreaves & Savitch LLP

(57) ABSTRACT

Systems and methods described herein create and schedule remote copy jobs that are distributed among several backup windows, thereby increasing backup service reliability and network resource utilization when copying data from local to remote site. This is accomplished by ranking backup windows by resource availability and proactively guiding a consumer to avoid selecting backup windows that may suffer from a temporal resource scarcity. Recommending suitable backup windows advantageously preserves SLAs by reducing SLA violations that otherwise may occur due to resource scarcity.

18 Claims, 13 Drawing Sheets

| ID | Start Time | End Time |
|---|---|---|
| 1 | 00:00:00 | 06:00:00 |
| 2 | 06:00:00 | 12:00:00 |
| 3 | 12:00:00 | 18:00:00 |
| 4 | 18:00:00 | 00:00:00 |

FIG. 7

| Name | Description | Active | Parameter |
|---|---|---|---|
| Default policy | Gray out a backup window if resources are insufficient to complete remote copy | True | n/a |
| Linear policy | Linearly score a backup window based on amount of resources available | True | 10 |

FIG. 8

| Name | Size | Storage Class | Region/AZ | Storage System | Storage System |
|---|---|---|---|---|---|
| vol-sales | 2 TB | Silver | us-west-1 | vsp-us-west-1-2 | Production Volume |
| vol-order | 1 TB | Silver | us-west-1 | vsp-us-west-1-3 | Production Volume |
| backup-vol-sales | 2 TB | Bronze | us-east-1 | vsp-us-east-1-1 | Backup Volume |
| backup-vol-order | 1 TB | Bronze | us-east-1 | vsp-us-east-1-1 | Backup Volume |

FIG. 9

| Storage System | Region | Availability Zone | Storage Class | Free Capacity |
|---|---|---|---|---|
| vsp-us-west-1-1 | us-west | us-west-1 | Gold | 1 TB |
| vsp-us-west-1-2 | us-west | us-west-1 | Silver | 2 TB |
| vsp-us-west-1-3 | us-west | us-west-1 | Silver | 4 TB |
| vsp-us-east-1-1 | us-east | us-east-1 | Bronze | 8 TB |
| vsp-us-east-1-2 | us-east | us-east-1 | Bronze | 4 TB |
| vsp-us-east-1-3 | us-east | us-east-1 | Silver | 4 TB |

FIG. 10

| Storage Class | Latency | IOPS | Throughput |
|---|---|---|---|
| Gold | 5 ms | 16000 | 1000 MiB/s |
| Silver | 10 ms | 8000 | 500 MiB/s |
| Bronze | 10 ms | 4000 | 250 MiB/s |

FIG. 11

| ID | Local Storage System | Remote Storage System | Bandwidth |
|---|---|---|---|
| 1 | vsp-us-west-1-2 | vsp-us-east-1-1 | 40 Gbps |
| 2 | vsp-us-west-1-2 | vsp-us-east-1-2 | 10 Gbps |
| 3 | vsp-us-west-1-2 | vsp-us-east-1-3 | 10 Gbps |
| 4 | vsp-us-west-1-3 | vsp-us-east-1-1 | 40 Gbps |
| 5 | vsp-us-west-1-3 | vsp-us-east-1-2 | 10 Gbps |
| 6 | vsp-us-west-1-3 | vsp-us-east-1-3 | 10 Gbps |

FIG. 12

| Timestamp | Local Storage Syatem | Remote Storage System | Throughput |
|---|---|---|---|
| 2023-08-01T00:00:00 | vsp-us-west-1-2 | vsp-us-east-1-1 | 8 Gbps |
| 2023-08-01T00:00:00 | vsp-us-west-1-2 | vsp-us-east-1-2 | 6 Gbps |
| ... | ... | ... | ... |
| 2023-08-28T23:59:00 | vsp-us-west-1-2 | vsp-us-east-1-1 | 7 Gbps |
| 2023-08-28T23:59:00 | vsp-us-west-1-2 | vsp-us-east-1-2 | 6 Gbps |

FIG. 13

| ID | Production Volume | Backup Volume | Schedule | Retention | Backup Window | Schedule Time |
|---|---|---|---|---|---|---|
| 1 | vol-sales | backup-vol-sales | Daily | 14 days | 18:00-00:00 | 20:00:00 |
| 2 | vol-order | backup-vol-order | Daily | 14 days | 18:00-12:00 | 00:00:00 |

FIG. 14

METHOD AND SYSTEM FOR PREVENTING SERVICE LEVEL AGREEMENT VIOLATIONS IN BACKUP-AS-A-SERVICE

BACKGROUND

Field

The present disclosure is directed to backup storage systems, and more specifically, toward systems and methods for preventing Service Level Agreement (SLA) violations in Backup-as-a-Service (BaaS) systems.

Related Art

BaaS is an SLA-centric data protection offering in which a service provider provides and manages the infrastructure, software, and services required for data backup and restoration. Service consumers can subscribe to and pay for different levels of services provided by the BaaS provider. Levels of services are defined in SLAs to which the consumer agrees when subscribing to the provider. Providers typically guarantee a minimum level of services set forth in the SLA, or else they pay a penalty to the consumer. BaaS has been growing rapidly because it relieves enterprises from capacity overprovisioning and long purchasing cycles and enables them to switch to pay-per-use subscription pricing.

In the related art, the backup window is one of the important SLAs. The service provider must complete the backup within the backup window specified by the Service Consumer. Since consumers are typically unaware of the resource utilization as resources managed by the provider, consumers often select backup windows during non-office hours such as 00:00-06:00 a.m. to avoid interference with normal operations. As a result, backup jobs accumulate within particular timeframes (here, non-office hours), causing temporary resource overload.

There are two main issues with the related art. In the first issue, there is the risk of an SLA violation, e.g., by virtue of a backup job not completing within a given timeframe, which may occur due to resource scarcity. Further, there can be a temporary resource overload in one timeframe, while resources are mostly underutilized in other timeframes.

Some approaches use data protection scheduling, which seeks to provide a flexible backup window in a data protection system. Unlike storage-level backup systems, such systems are agent-based and utilize historical data, such as CPU and network utilization of backup agents and backup jobs, to determine whether a job can be completed within a specified backup window. In such data protection scheduling schemes, high-priority jobs are scheduled within a specified backup window, whereas low-priority jobs are moved outside of that window in the event that not all jobs can be completed within the specified backup window. Jobs falling outside of the backup window start whenever sufficient resources become available and stop whenever resources become insufficient. However, because agent-based systems focus on the current time window and priority of jobs to distribute according to priority, they are ill-equipped to identify whether source and destination storage systems can present bottlenecks, thus leading to incorrect decisions regarding backup job completion and, ultimately, SLA violations. Further, existing approaches lack criteria for ranking time windows to allow for the identification and selection of the most appropriate backup windows. As a result, remote copy jobs cannot be distributed across several backup jobs, thus leaving available resources underutilized. Therefore, it is desirable to have systems and methods that utilize source and destination storage system information to determine if a remote copy job can be performed within each backup window and, if so, distribute remote copy jobs, e.g., based on some criteria, over different backup windows.

SUMMARY

In some aspects of the present disclosure, system and methods provide to a first interface in a network, a selection of data to be backed up from a primary site to a remote site; estimate required resources for executing a backup of the data from the primary site to the remote site; for a plurality of time windows, network information, which may include a current throughput obtained from a storage system, is used to obtain a network resource utilization estimate; the estimated required resources and the network resource utilization estimate are used to determine, among the plurality of time windows, one or more time windows in which network resources are insufficient to execute the backup; and a selection option for the plurality of time windows, excluding, at the least, the one or more time windows, is provided to a second interface in the network, thereby preventing SLA violations when executing the backup.

Aspects of the present disclosure involve using the required resources and the network resource utilization estimate to assign a score to each selection option, e.g., by referencing a score policy table that includes a base score that is used to derive the score and is indicative of the required resources. For each of the plurality of time windows, an SLA violation risk is determined. The second interface is configured to display the score and further configured to indicate the presence of the SLA violation risk to discourage a selection of selection options that are likely to cause an SLA violation. The second interface is further configured to display, for each selection option, an indication about the availability of a discount. The second interface is further configured to pre-select, among the plurality of time windows, a time window associated with the highest score.

Aspects of the present disclosure involve estimating the required resources including using a size of a volume associated with the selection for the data, a storage class throughput, and an interval between jobs to estimate the amount of the data that is to be backed up. Estimating the required resources may further include using a service level of the backup and historical data.

Aspects of the present disclosure involve means for using required resources and a network resource utilization estimate to assign a score to each selection option; means for deriving the score, which is indicative of the required resources, from a base score that is stored in a score policy table; means for displaying the score, e.g., together with availability of a discount and/or an indication of the presence of the SLA violation risk to discourage a user from selecting a window likely to cause an SLA violation; means for pre-selecting a time window associated with the highest score; means for estimating the required resources comprises using a size of a volume associated with the selection for the data, a storage class throughput, and an interval between jobs to estimate an amount of the data that is to be backed up; and means for estimating the required resources comprises using a service level of the backup and historical data.

BRIEF DESCRIPTION OF DRAWINGS

FIG. 5 is an exemplary screen image that a BaaS management program displays to a service consumer to create a new volume with backup.

FIG. 6 is an exemplary screen image that a BaaS management program displays to a service consumer to set up a backup for an existing production volume.

FIG. 7 is a screen image of an exemplary backup window table.

FIG. 8 is a screen image of an exemplary scoring policy table.

FIG. 9 is a screen image of an exemplary volume table.

FIG. 10 is a screen image of an exemplary storage system table.

FIG. 11 is a screen image of an exemplary storage class table.

FIG. 12 is a screen image of an exemplary network capacity table.

FIG. 13 is a screen image of an exemplary network usage table.

FIG. 14 is a screen image of an exemplary job table.

DETAILED DESCRIPTION

Figure 1:
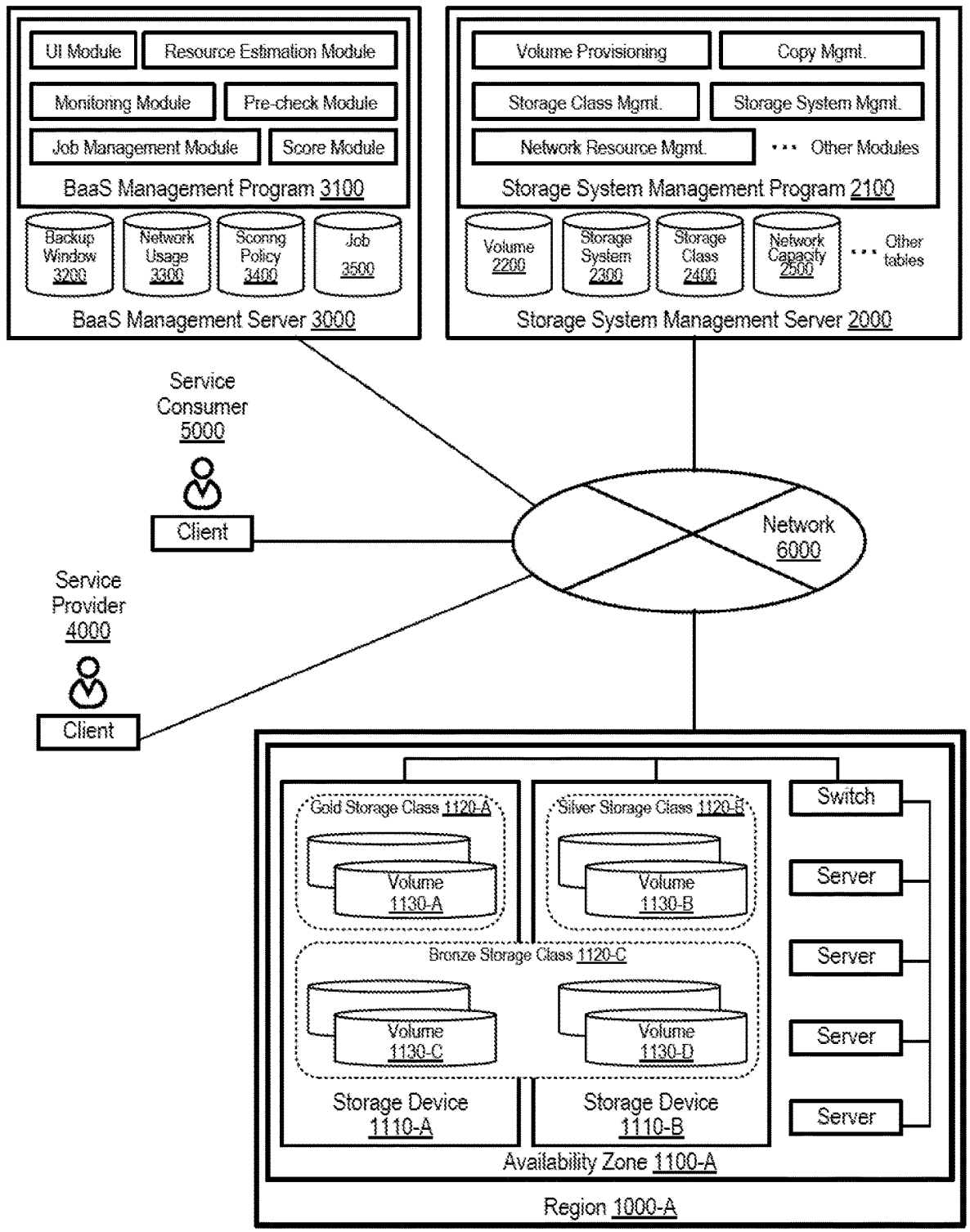
FIG. 1 illustrates a system for preventing SLA violations in BaaS systems, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations. In this document, the terms "backup window," "time window," and "timeframe" are used interchangeably. Similarly, the terms "service provider," are used interchangeably. The term "consumer" refers to an entity such as an end user. "UI" refers to a graphical user interface.

FIG. 1 illustrates a system for preventing SLA violations in BaaS systems, in accordance with an example implementation. In embodiments, system 100 may comprise regions (e.g., 1000-A), storage system management server 2000, BaaS management server 3000, service provider 4000, and service consumers (e.g., 5000). It is understood that any number of components in system 100 may connect to each other via network 6000 (e.g., Internet). Service provider 4000 manages region 1000, storage system management server 2000, BaaS management server 3000, and network 6000 to provide BaaS to service consumer 5000. Service consumer 5000 may use a user interface (UI) to initiate a backup, e.g., for a production volume. As depicted in FIG. 1, the UI may be implemented in a UI module in BaaS management program 3100 of BaaS management server 3000.

Region 1000 may be associated with a geographical region and comprise one or more smaller geographical regions, such as availability zone (AZ) 1100-A. As an example, a US-West region may be divided into AZs such as US-West-1 for Northern California and US-West-2 for Southern California. Further, AZ 1100-A may be associated with an on-premises datacenter or be cloud-based. As depicted, AZ 1100-A may comprise storage devices or storage systems (e.g., 1110-A) that may be coupled to communicate with any number of servers, e.g., via one or more switches.

Storage device 1110 may have one or more storage classes 1120. For example, storage device 1110-A comprises two storage classes: gold storage class 1120-A and bronze storage class 1120-C. A storage class is characterized by the gradation of one or more key performance indicators, such as input-output operations per second (IOPS), latency, throughput, etc. Storage classes can span over one or more storage devices 1110. For example, bronze storage class 1120-C spans over storage device 1110-A and storage device 1110-B. Further, any number of volumes 1130 may be provisioned within a storage class of a storage device.

Storage management server 2000, once connected to network 6000, may operate in any one of the regions or in the cloud, e.g., to provide desired storage management functions, such as volume provisioning, copy management, etc. Storage system management program 2100 may provide a UI to service provider 4000, e.g., for defining storage classes and storage class table 2400, or registering information about storage systems, such as regions, AZs, storage class, capacity, etc., to create storage system table 2300. Service provider 4000 may further register network connections and/or bandwidth between storage systems to create network capacity table 2500. Further, storage system management program 2100 may, in response to receiving instruction from BaaS management program 3100, provision production and backup volumes to create volume table 2200. Storage system management program 2100 may further set up remote copies between production and backup volumes.

Volume table 2200 in FIG. 1 stores information about the created volumes, such as their size, storage class, storage system that they are provisioned on, etc. Storage system table 2300 stores information about the storage systems such as their location, storage class supported by them, etc. Storage class table 2400 stores performance characteristics of storage classes, such as latency, throughput, etc. Network capacity table 2500 stores information, such as which storage systems are connected to each other, the bandwidth between them, and the like.

As with storage management server 2000, BaaS management server 3000, once connected to network 6000, may operate in any one of the regions or in the cloud. Baas management server 3000 may utilize storage system management server 2000 for storage management functions, such as volume provisioning, copy management, storage system management, storage class management, network capacity management, etc.

Based on information that service consumer 5000 provides (e.g., via UI) to BaaS management server 3000, BaaS management program 3100 may perform one or more of the following tasks, e.g., to set up a backup for a production volume of service consumer 5000 or to manage backup windows and a scoring policy for service provider 4000:

(1) estimating an amount of data to be transferred by a backup job when executed; (2) estimating an amount of data that can be transferred within each backup window; (3) for each backup window, comparing the amount of data to be transferred with the amount of data that can be transferred; (4) assigning a score to each backup window based on the amount of data that can be transferred; (5) displaying, via the UI, a list of backup windows with scores to service consumer 5000; (6) preventing service consumer 5000 from selecting a backup window within which a backup job is expected to fail due to resource scarcity, and allowing service consumer 5000 to select one or more backup windows; (7) determining a storage system for production and backup volumes; (8) instructing storage system management program 2100 to provision production and backup volumes and set a remote copy between production and backup volumes; (9) and creating a backup job and scheduling it within the backup window.

Similarly, based on information that service provider 4000 provides (e.g., via UI) to BaaS management server 3000, BaaS management program 3100 may perform one or more of the following tasks: (1) creating a list of backup windows, and storing them in backup window table 3200; and (2) storing custom scoring policies in scoring policy table 3400.

Backup window table 3200 stores a list of backup windows that are created by service provider 4000. Network usage table 3300 stores timeseries data of network throughput between connected storage systems. Scoring policy table 3400 stores a scoring policy that is used to score the backup windows. Job table 3500 stores the information about the backup job created by the service consumer 5000.

Figure 2:
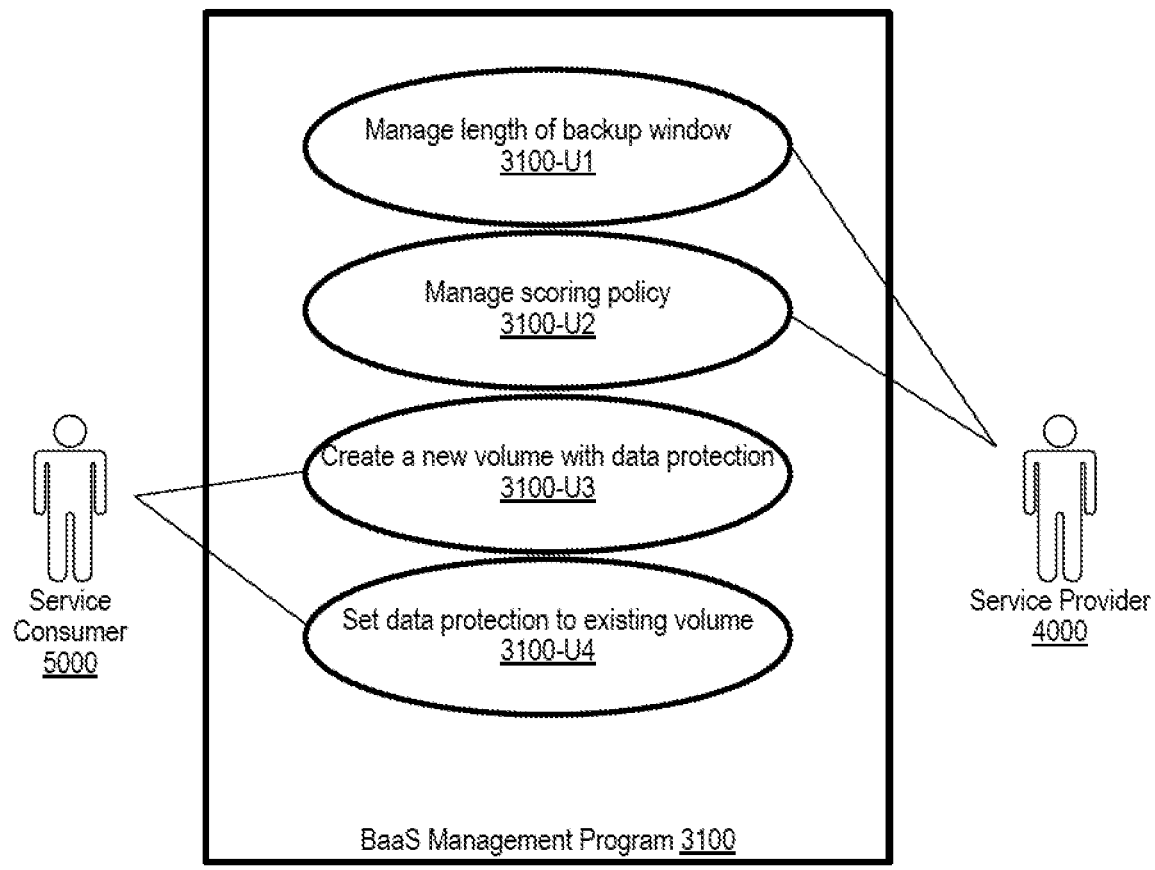
FIG. 2 is a diagram for a use case for a BaaS management server using a BaaS management program to prevent SLA violations in BaaS systems such as that in FIG. 1.

FIG. 2 is a diagram for a use case for a BaaS management server using a Baas management program to prevent SLA violations in BaaS systems such as that in FIG. 1. In response to receiving input from service provider 4000, BaaS management program 3100 performs operations comprising managing (3100-U1) the length or duration of a backup window, as discussed in greater detail with reference to FIG. 3 and FIG. 15; and managing (3100-U2) a scoring policy, as discussed in greater detail with reference to FIG. 4 and FIG. 16.

Similarly, in response to receiving input from storage consumer 5000, BaaS management program 3100 performs operations comprising creating (3100-U3) a new volume with data protection, as discussed in greater detail with reference to FIG. 5 and FIG. 17; and setting (3100-U4) data protection to an existing volume, as discussed in greater detail with reference to FIG. 6 and FIG. 17.

Figure 3:
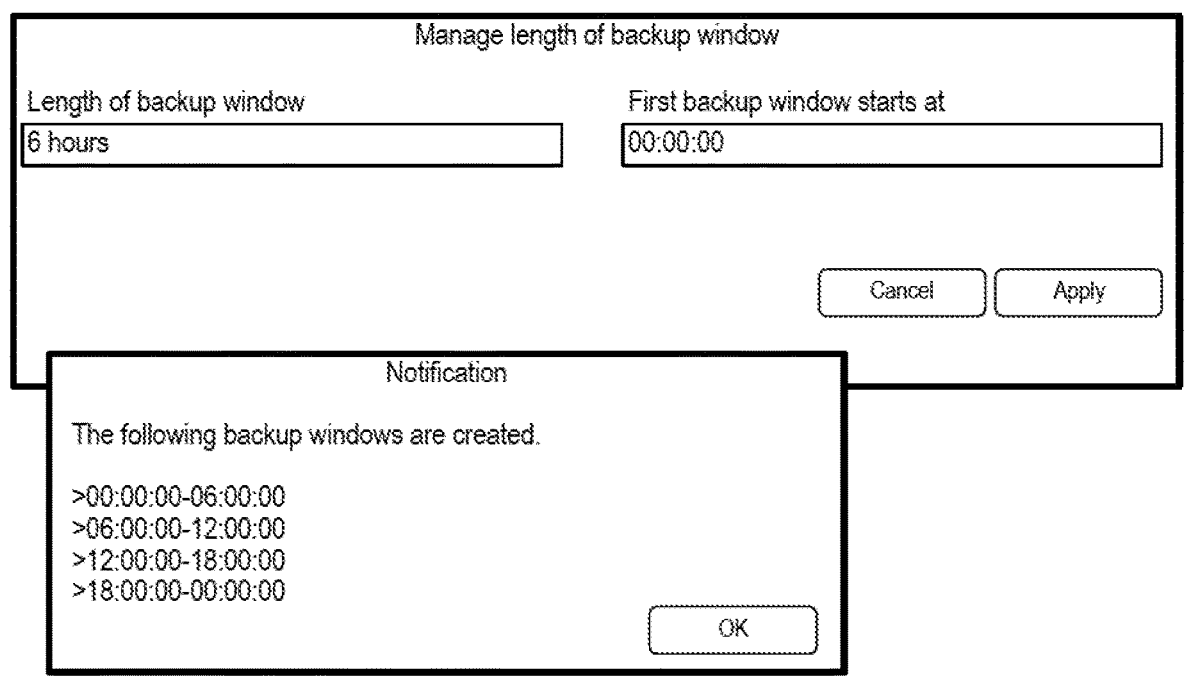
FIG. 3 depicts an exemplary screen image that a BaaS management program displays to a service provider to manage the length of a backup window.

FIG. 3 depicts a screen image that BaaS management program 3100 displays to service provider 4000 to manage the length of a backup window. In response to service provider 4000 providing the length of the backup window and the start time of the first backup window, BaaS management program 3100 creates a set of backup windows that are then displayed in a notification window. As indicated in FIG. 3, the start time of the first backup window is 00:00:00 and the length of the backup window is six hours. As a result, as shown in the notification window, a total of four backup windows are created.

Figure 4:
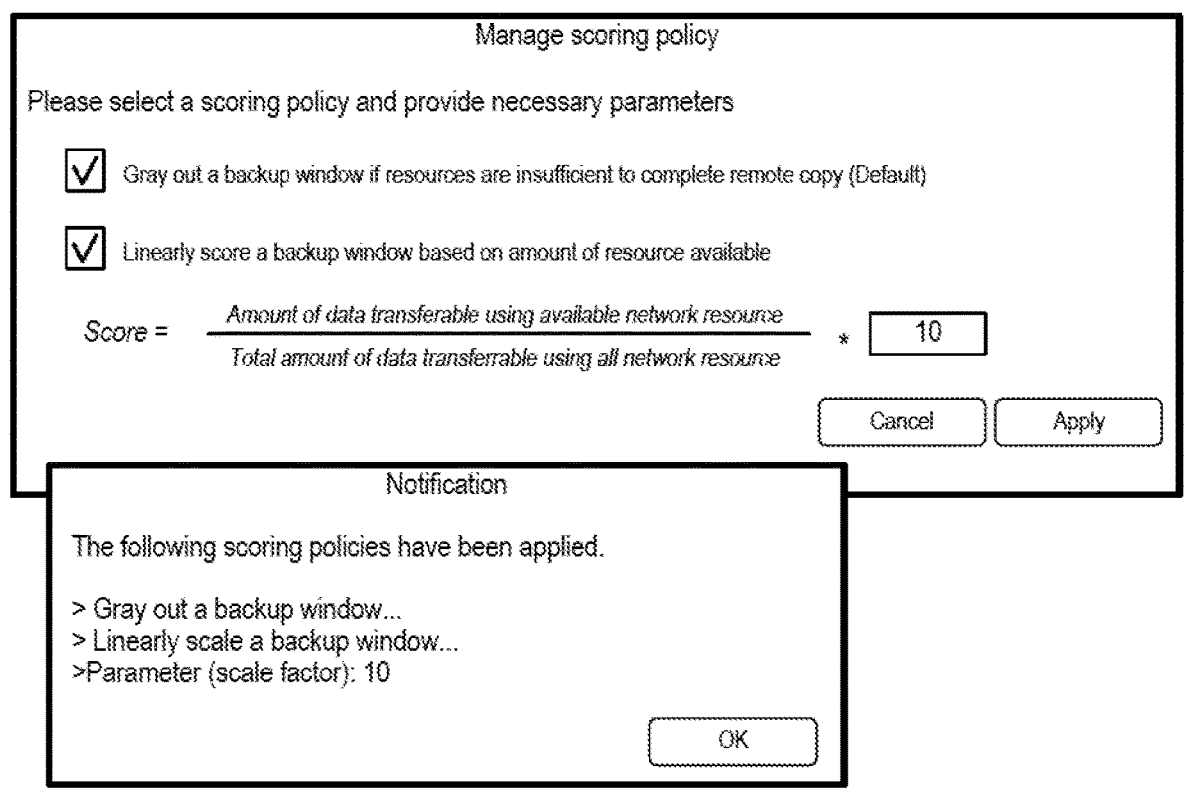
FIG. 4 is an exemplary screen image that a BaaS management program displays to a service provider to manage a scoring policy.

FIG. 4 is a screen image that BaaS management program 3100 displays to service provider 4000 to manage a scoring policy. As shown, a default policy can be pre-selected such as to gray out or disable a backup window option such that it cannot be changed by the service provider if network resources for that window are insufficient to complete that remote copy job. Within the management scoring policy window, service provider 4000 may select to apply a policy to each backup window to score the window based on the amount of data that can be transferred within that backup window. By default, the value of the score may be normalized to assume a value from 0 to 1. Yet, it is understood that service provider 400 may specify a scaling parameter, e.g., in the text box shown next to the equation in the management scoring policy window. The notification window in FIG. 4 is used to confirm selected policy parameters. As depicted, service provider 4000 has selected a policy to linearly scale backup windows, using a scale factor of 10 as a scaling parameter.

Figure 5:
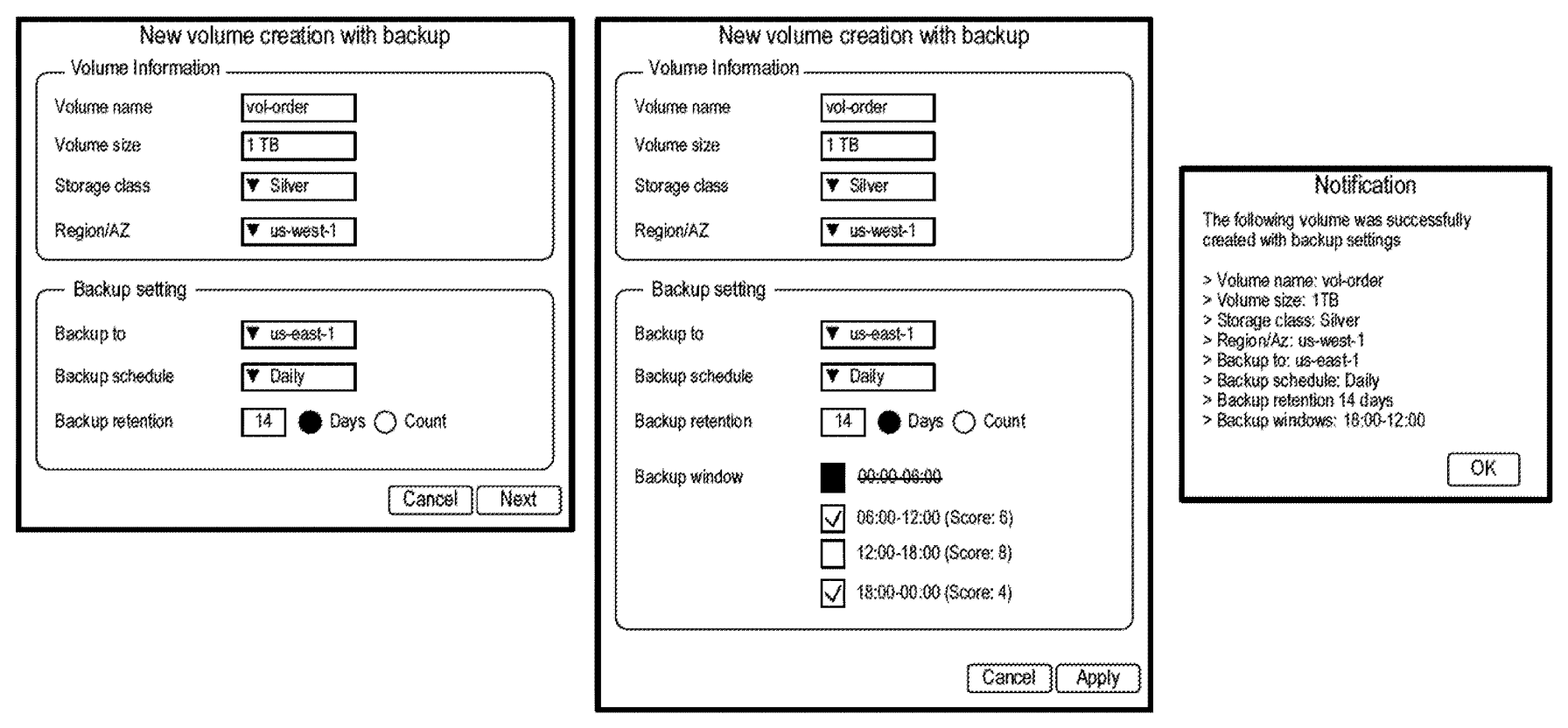

FIG. 5 is a screen image that BaaS management program 3100 displays to service consumer 5000 to create a new volume with backup. As depicted, service consumer 5000 may enter volume information, such as the name, size, storage class, and region/AZ of the production volume. Service consumer 5000 further enters backup settings, such as the region/AZ, schedules, and the retention of the backup volume. Once the Next button is selected, a list of backup windows that have assigned scores is suggested to service consumer 5000, e.g., according to the process illustrated in FIG. 17. Service consumer 5000 can select one or more backup windows. Selecting a backup window associated with a higher score is typically advantageous as it represents higher network resource availability that aids in ensuring that, if selected, that backup job has a greater likelihood of successfully completing once it commences during that backup window. Then, once the Apply button is selected, production volume and backup volumes are created and stored in volume table 2200 and a backup job is created and stored in job table 3500. As depicted, a notification may be displayed to provide confirmation that the operation has been scheduled according to the selections made. Also as depicted, the backup window "00:00-06:00" selection is disabled, due to it being reserved by a number of users over the threshold.

Figure 6:
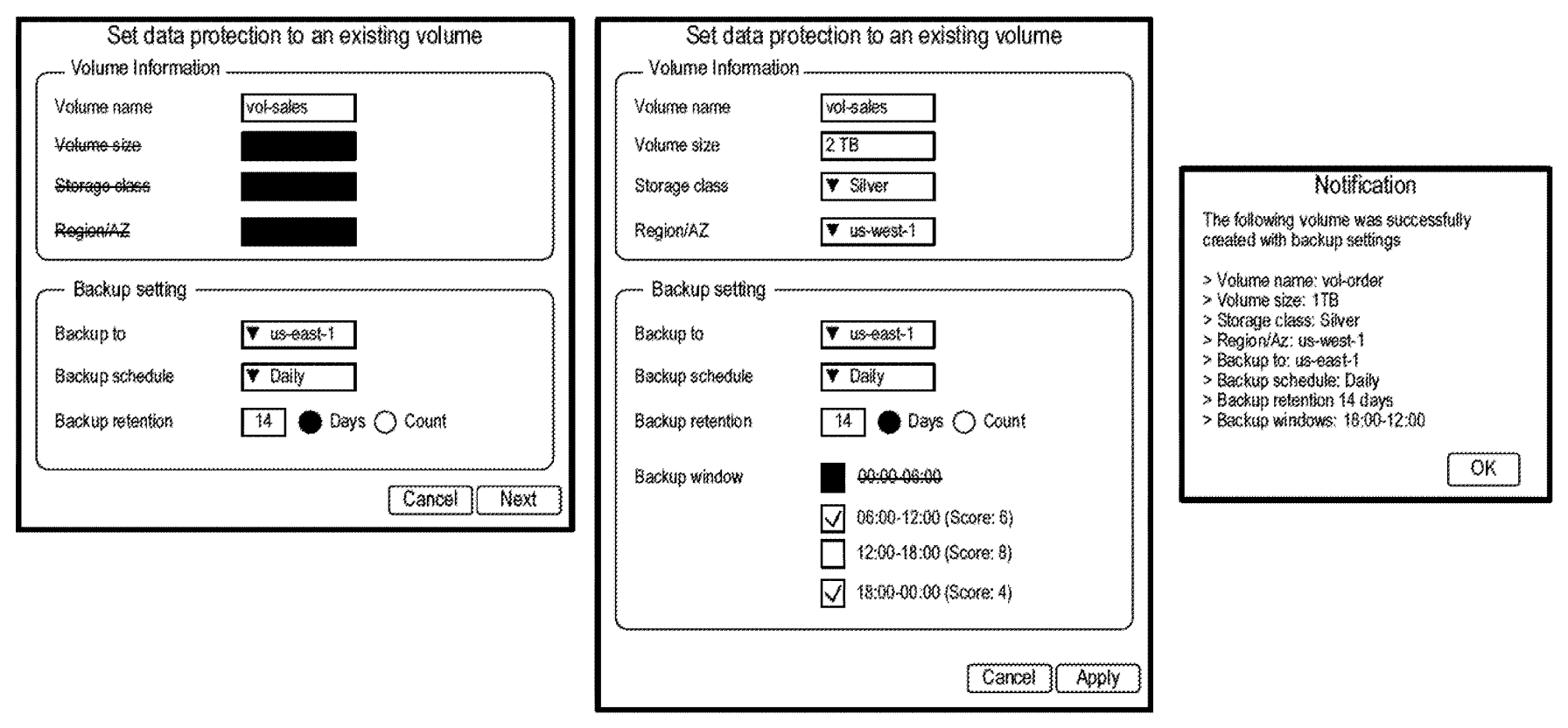

FIG. 6 is a screen image that BaaS management program 3100 displays to service consumer 5000 to set up a backup for an existing production volume. Service consumer 5000 selects the name of the production volume. The BaaS management program 3100 refers to the information about the selected volume from volume table 2200 and auto fills volume size, storage class and region/AZ for reference of service consumer 5000. Service consumer 5000 enters backup settings, such as the region/AZ, schedules, and the retention of the backup volume, which can be expressed in a number of instances or days. As depicted here, volume size, storage class, region/AZ and backup window "00:00-

06:00" are also disabled as the information regarding the selected volume was imported or the selection is unavailable.

Figure 17:
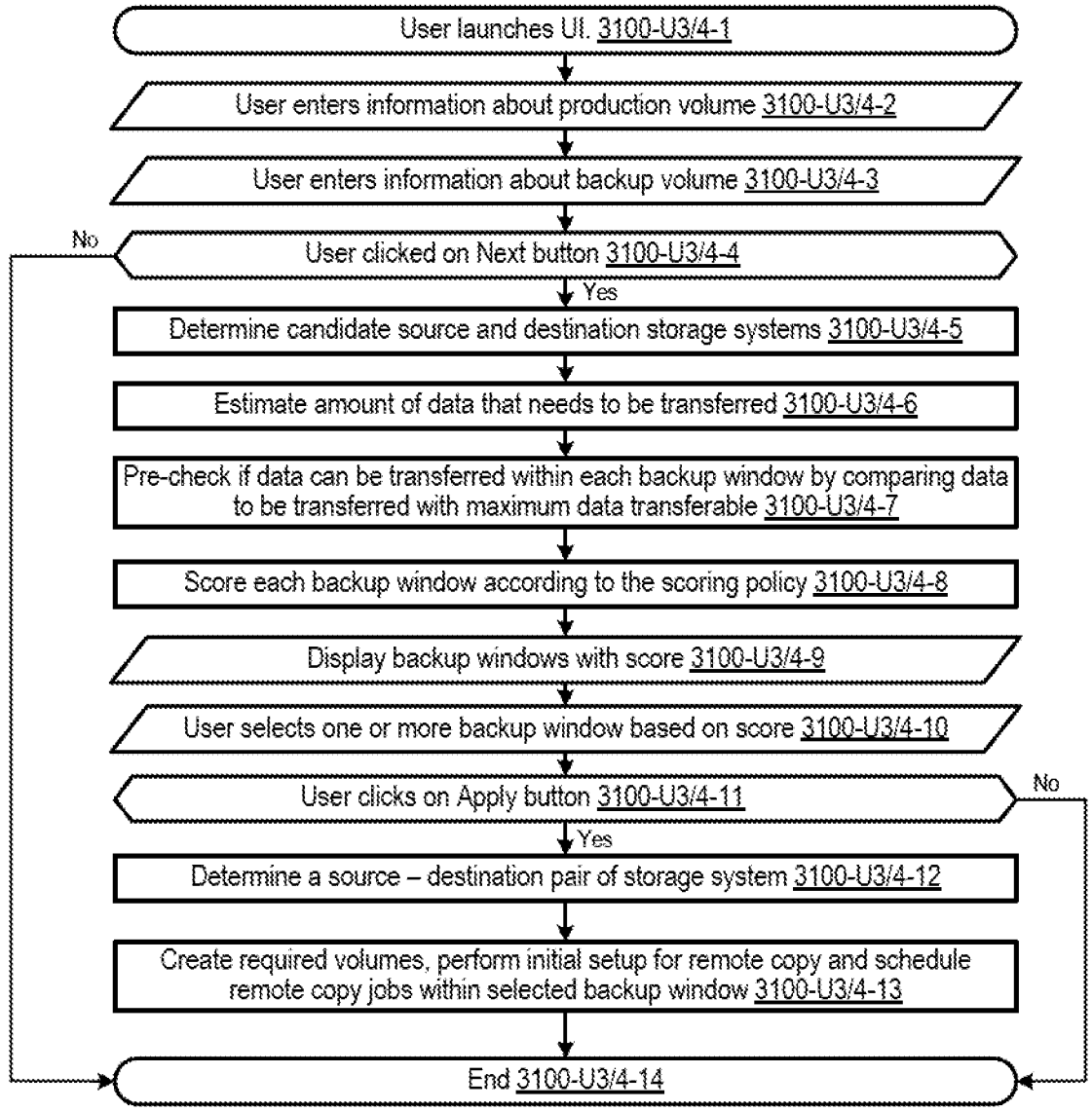
FIG. 17 illustrates an exemplary process for a BaaS management program interacting with a storage system management server and interacting with a service consumer.

Once the Next button is selected, a list of backup windows options with scores are suggested to service consumer 5000, e.g., according to the process shown in FIG. 17. Guided by the presented scores, service consumer 5000 selects one or more backup windows. Again, selecting a backup window having a higher score is recommended because such backup windows have more available network resources, and hence the backup job is virtually guaranteed to be complete. Once the Apply button is selected, production volume and backup volumes are created and stored in volume table 2200 and a backup job is created and stored in the job Table 3500 and as before, an appropriate confirmation notice may be displayed.

FIG. 7 is a screen image of a backup window table, such as table 3200 stored in BaaS management server 3000. Backup window table 3200 comprises the start times and end times of the backup windows created, e.g., according to the flowchart shown in FIG. 15. Backup window table 3200 may be created in response to information provided by service provider 4000, such as the information shown in the UI shown in FIG. 3.

FIG. 8 is a screen image of a scoring policy table. Scoring policy table 3400 is stored in BaaS management server 3000 shown in FIG. 1. Table 3400 stores information related to a scoring policy set by service provider 4000, e.g., according to the information shown in the UI in FIG. 4. As shown in FIG. 8, the Name column stores a name for the policy. The Description column stores a description of the policy as displayed in the UI. The Active column stores information about whether the policy has been activated. It is noted that a default policy may be set to a default status of active. The Parameter column stores any policy-related parameters that are used, e.g., for calculating a score. In the event that no parameters are applicable "n/a" may be stored.

FIG. 9 is a screen image of a volume table. Volume table 2200 is stored in storage system management server 2000 (shown in FIG. 1). The stored information is used by BaaS management program 3100, e.g., to retrieve information such as size, storage class, and region/AZ of a volume selected by service consumer 5000 via the UI shown in FIG. 6. For a production volume, the Size column, Storage Class column, and Region/AZ columns of the volume are provided by service consumer 5000, e.g., via the UI shown in FIG. 5. As depicted, for a backup volume, the Size is same as that of the production volume; for cost optimization, Storage Class may be set to a lowest performance storage class (e.g., Bronze); and Region/AZ is provided by service consumer 5000 in the text field denoted as "Backup to" shown in the UI in FIG. 5 and FIG. 6. A Storage System is determined by BaaS management program 3100, e.g., by matching a location, storage class, and size of the volume with the location, storage class, and an available capacity of the storage system (stored in storage system table 2300).

FIG. 10 is a screen image of a storage system table. Storage system table 2300 is stored in storage system management server 2000. The information therein is used by BaaS management program 3100 to retrieve information such as region, AZ, storage class, and available capacity of storage systems and compare them to region, AZ, storage class, and size of the volume such as to determine a candidate storage system for provisioning the volume. Region, AZ, and Storage Class are provided by service provider 4000, e.g., by using the storage system management module of storage system management program 2100.

Storage Class takes one of the values pre-defined by service provider 4000 in storage class table 2400. The Free Capacity value may be updated every time a new volume is provisioned in the storage system.

FIG. 11 is a screen image of a storage class table. Storage class table 2400 is stored in storage system management server 2000 and is used by BaaS management program 3100 to define a list of storage classes, which are shown in the UI of FIG. 5. Storage classes are defined by service provider 4000, e.g., by using the storage class management module of storage system management program 2100 and they are selectable by service consumer 5000. As depicted in FIG. 11, storage classes for backup volumes may be categorized by throughput levels that represent their performance. Storage classes may be referred to by their throughput, e.g., when determining an amount of to-be-transferred data, as discussed in greater detail with reference to step 3100-U3/4-6 of the flowchart shown in FIG. 17.

FIG. 12 is a screen image of a network capacity table. Network capacity table 2500 is stored in storage system management server 2000 and is used by the BaaS management program 3100 to refer to the bandwidth of the network connection between local and remote storage systems. BaaS management program 3100 may do so, for example, in step 3100-U3/4-7 of the flowchart shown in FIG. 17. The information is provided by service provider 4000, e.g., by using the network management module of storage system management program 2100.

FIG. 13 is a screen image of a network usage table. Network usage table 3300 is stored in BaaS management server 3000 and stores the timeseries data of the network throughput between the local and the remote storage system. The connection between local and remote storage systems is defined in network capacity table 2500. Network usage table 3300 is used by BaaS management program 3100 to estimate a network throughput between local and remote storage systems as discussed in greater detail with reference to step 3100-U3/4-7 of the flowchart in FIG. 17.

A monitoring module of BaaS management program 3100 may monitor network connections defined in network capacity table 2500 and collect the timeseries data of the network throughput. The granularity and the retention of the timeseries data differs from one circumstance to another. A granularity of 1-minute will require a higher data storage cost than 5-minute a granularity. Similarly, a retention of 1-week requires a lower data storage cost than that of 1-month. In this embodiment, a granularity of 1-minute and a retention of 5-weeks is used to collect sufficient data to capture daily, weekly, and monthly trends.

FIG. 14 is a screen image of a job table. Job table 3500 is stored in BaaS management server 3000 and stores information about the backup job which is successfully created after service consumer 5000 has provided the relevant information from the UI of FIG. 5 or FIG. 6. Information in the Production Volume, Schedule, and Retention columns are populated, e.g., via the UI of FIG. 5 or FIG. 6, by service consumer 5000, who also selects a Backup Window. A Backup Volume is determined automatically based on a rule-based selection. In this embodiment, the rule is to attach the prefix "Backup" to the name of the production volume. Scheduled Time is determined by the job management module of BaaS management program 3100 and identifies a time within the backup window. The same module is responsible for initiating the backup at its scheduled time.

Figure 15:
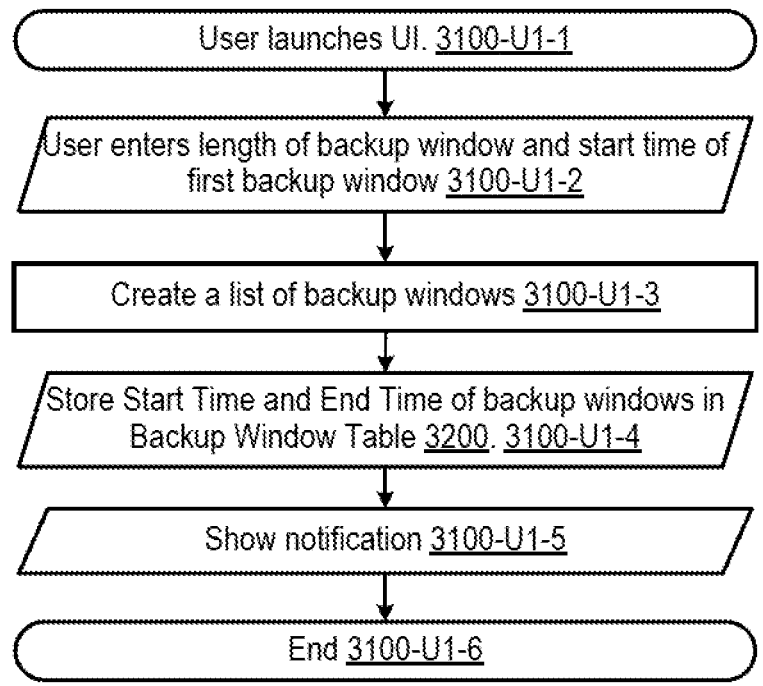
FIG. 15 illustrates an exemplary process for managing the length of a backup window.

FIG. 15 illustrates a process for managing the length of a backup window. The process begins when a user, e.g., service provider 4000, causes BaaS management program 3100 to launch (3100-U1-1) a UI. The user then enters (3100-U1-2) the length of the backup window and the start time of the first backup window, e.g., followed by clicking the Apply button shown in the UI of FIG. 3. In response to receiving the information from the UI, BaaS management program 3100 creates (3100-U1-3) a list of backup windows and stores (3100-U1-4) the Start Time and the End Time of the backup windows in backup window table 3200. Finally, BaaS management program 3100 displays (3100-U1-5) a confirmation notice to service provider 4000 indicating which backup windows have been created.

Figure 16:
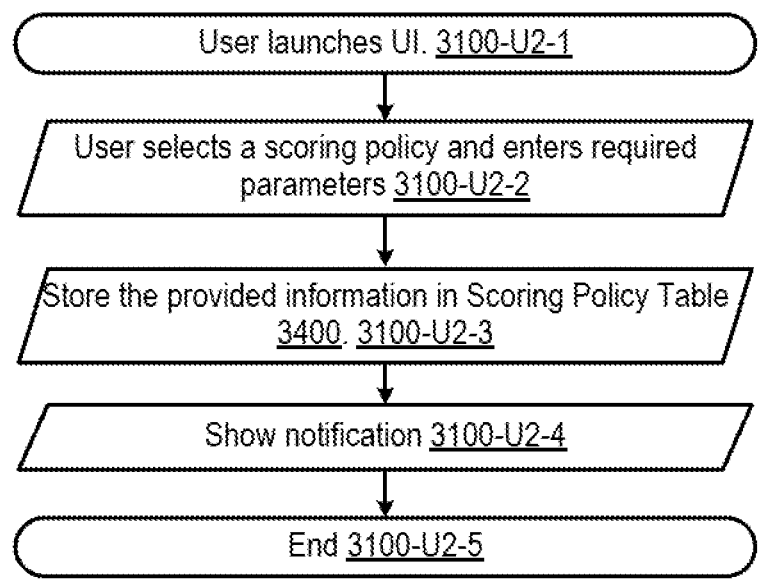
FIG. 16 illustrates an exemplary process for managing a scoring policy.

FIG. 16 illustrates a process for managing a scoring policy. Similar to the process in FIG. 15, the process in FIG. 16 begins when the user causes BaaS management program 3100 to launch (3100-U2-1) a UI. The user uses information in the UI of FIG. 4 to select (3100-U2-2) a scoring policy, enters the requested parameters, and clicks the Apply button. In response to receiving the information from the UI, BaaS management program 3100 stores (3100-U2-3) the information in scoring policy table 3400 and displays (3100-U2-4) displays a confirmation notice to service provider 4000, indicating which options have been selected.

FIG. 17 illustrates a process for BaaS management program 3100 interacting with a storage system management server 2000 and interacting, via UIs, with a service consumer. The process begins when service consumer 5000 launches (3100-U3/4-1) a UI, e.g., such as those shown in FIG. 5 or FIG. 6. Service consumer 5000 enters information about the production volume (3100-U3/4-2). In the case of FIG. 5, service consumer 5000 enters the name, size, storage class, and region/AZ of the production volume. Conversely, in the case of FIG. 6, service consumer 5000 selects the name of an existing production volume.

BaaS management program 3100 communicates with storage system management server 2000 to perform steps comprising fetching the size, storage class, and region/AZ of the selected production volume stored in volume table 2200, filling the UI with the fetched information, and displaying the information to service consumer 5000 who then enters (3100-U3/4-3) the region/AZ, schedule, and retention of the backup volume. If service consumer 5000 clicks (3100-U3/4-4) on the Next button, the process advances to step 3100-U3/4-5; otherwise, the process ends. At step 3100-U3/4-5, BaaS management program 3100 identifies a list of candidate source and destination storage systems based on information provided in the UI of FIG. 5 or FIG. 6 and storage system table 2300.

As depicted in FIG. 5, the requested size of the production volume is 1 TB; the storage class is Silver, and the location is us-west-1. Referring to storage system table 2300 in FIG. 10, vsp-us-west-1-2 and vsp-us-west-1-3 satisfy the criteria for the production volume and are, thus, potential candidate source storage systems. The requested backup volume is in us-east-1. Since the backup volume is simply a replicate or mirror of the production volume, its size is the same as that of the production volume, here, 1 TB. Since, as previously mentioned, the backup volume is generally stored in a lower-performance storage class, its storage class is determined to be the Bronze storage class. Referring to storage system table 2300, vsp-us-east-1-1 and vsp-us-east-1-2 satisfy the criteria required for the backup volume, and hence are candidate destination storage systems.

Concerning FIG. 6, as the production volume is already provisioned, the source storage system is uniquely identified by referring to volume table 2200. In this case, vol-sales has already been provisioned in vsp-us-west-1-2. Hence, the candidate source storage system is vsp-us-west-1-2. Regarding candidate destination storage systems, the requested backup volume is in us-east-1. Since the backup volume is simply a replicate of the production volume, its size is the same as that of the production volume, here, 2 TB. And the storage class for the backup volume is determined to be Bronze again. Referring to storage system table 2300, vsp-east-1-1 and vsp-east-1-2 satisfy the criteria required for the backup volume, and hence are candidate destination storage systems.

At step 3100-U3/4-6, BaaS management program 3100 uses the resource estimation module to estimate an amount of data to be transferred between two executions of the backup job. There are different ways in which the estimate can be performed in different circumstances. In a conservative estimation, the estimate uses the upper bound of the data that needs to be transferred. It is known that the maximum amount of data that needs to be transferred is the minimum of the size of the production volume or the amount of data that is written to the volume between two consecutive executions of the backup job. This can be written by the following equation and does not require historical data:

$$\text{data to be transferred} = \min(\text{size of volume}, \text{throughput of storage class} * \text{interval between jobs})$$

The size of the volume and the throughput of the storage class can be referenced from the UI and the Storage class table 2400. As a conservative estimate tends to overestimate the data to be transferred and, hence, may lead to a faulty assumption that a network of higher bandwidth is required. Therefore, in embodiments, more liberal estimates are employed that utilize historical data. For example, if time-series data of IOPS of volumes of the same storage class in the same storage system as the production volume are available, the amount of data that will be written to the production volume between two executions of the backup job can be estimated. The estimate can be an average, a percentile, predicted by some statistical inference, or any other known calculation method.

At step 3100-U3/4-7, BaaS management program 3100 uses a pre-check module to determine if data can be transferred within each backup window by comparing the amount of data to be transferred, which was estimated at step 3100-U3/4-6, with the amount of data that can be transferred as discussed next with reference to FIG. 18.

Figure 18:
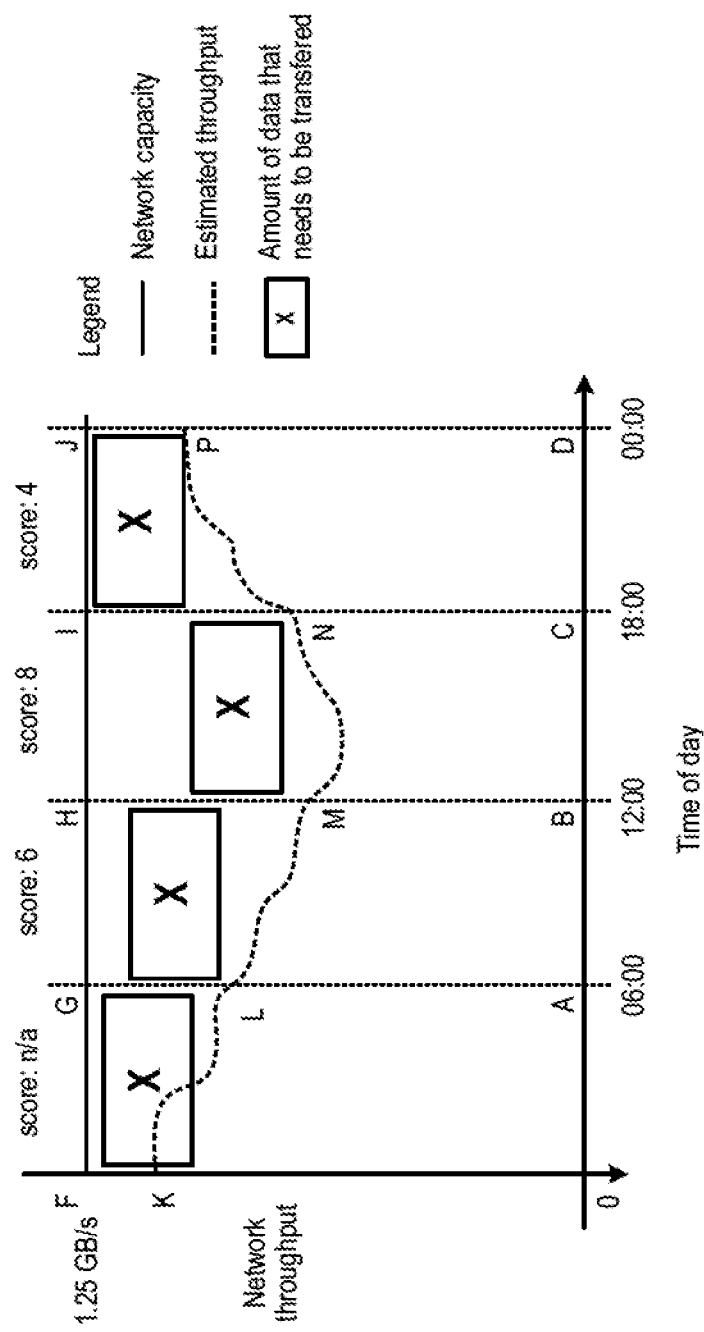
FIG. 18 diagrammatically shows how to calculate an amount of data that can be transferred within a given backup window.

FIG. 18 diagrammatically shows how to calculate an amount of data that can be transferred within a given backup window. For a candidate source-destination storage system pair determined at step 3100-U3/4-5 (e.g., vsp-west-1-2 and vsp-east-1-2), a network capacity is obtained from network capacity table 2500 (represented by solid horizontal line F-J in FIG. 18) and network throughput is estimated using historical data from network usage table 3300 (represented by dotted curve K-P in FIG. 18). It is understood that other estimation methods may be utilized. Examples include using an average, a 90th percentile, or a statistical inference of recent 5 weeks of data to cover daily, weekly, or monthly trends.

Data to be transferred, represented by a box in FIG. 18, is calculated at step 3100-U3/4-6. The amount of data that can be transferred using available network resources within backup windows 00:00-06:00, 06:00-12:00, 12:00-18:00, and 18:00-00:00 corresponding to respective areas KLGF, LMHG, MNIH, and NPJI are shown. The total amount of data that can be transferred using all network resources within backup windows 00:00-06:00, 06:00-12:00, 12:00-18:00, and 18:00-00:00 corresponding to respective areas OAGF, ABHG, BCIH, and CDJI are also shown. That value is used to normalize the score.

If there exists a source-destination storage system pair such that the amount of data to be transferred is less than the amount of data that can be transferred, then that backup window is safe for service consumer 5000 to select. In FIG. 18, it is safe for service consumer 5000 to select all the backup windows except the window 00:00-06:00.

Returning to FIG. 17, BaaS management program 3100 assigns, at step 3100-U3/4-8, a score to each of the backup windows based on the policies which are activated in scoring table 3400. According to the default policy, the backup window during which there are no sufficient network resources to complete the remote copy is grayed out such that service consumer 5000 cannot select it. For example in FIG. 18, only the backup window 00:00-06:00 would be grayed out.

According to the linear policy, a backup window during which more data can be transferred is assigned a higher score that may be calculated as follows:

$$\text{score} = \frac{\text{Amount of data that can be transferred using available network resources}}{\text{Total amount of data that can be transferred using all network resources}} * \text{scaling factor}$$

The amount of data that can be transferred is estimated at step 3100-U3/4-7 of FIG. 17. The score can be normalized to take value from 0 to 1 by the total amount of data that can be transferred using all network resources which is estimated at step 3100-U3/4-7. A scaling factor provided by service provider 4000 can be referenced from scoring policy table 3400.

In the example in FIG. 18, backup window 00:00-06:00 is not applicable for scoring, while other backup windows 06:00-12:00, 12:00-18:00, and 18:00-00:00 are assigned respective scores of 6, 8, and 4 depending on the amount of data that can be transferred within that window. In some implementations, the score may be equivalent to a provided discount such as to encourage service consumer 5000 to select a backup window associated with more available network resources.

At step 3100-U3/4-9, BaaS management program 3100 displays the backup windows with their respective scores to service consumer 5000, who, at step 3100-U3/4-10, selects one or more backup windows based on the score. The score encourages service consumer to select backup windows with more available resources so that backup jobs are completed and no SLA violations occur. At step 3100-U3/4-11, if service consumer 5000 clicks on the Apply button, the process resumes with step 3100-U3/4-12; otherwise, the program ends. At step 3100-U3/4-12, if there exist several pairs of source-destination storage systems that can satisfy the SLA (i.e., have sufficient network resources to complete the remote copy), then the pair can be selected according to some rule depending on the circumstances. An exemplary rule may be to select the pair that can transfer the largest amount of data, then select the pair that has more free storage capacity, and then randomly select a pair. This step uniquely identifies a single pair of source-destination storage systems.

At step 3100-U3/4-13, BaaS management program 3100 instructs storage system management program 2100 to provision the volumes in the selected storage systems and sets up a replication between production and backup volumes. BaaS management program 3100 further instructs the job management module to create a backup job and register the information in job table 3500. Finally, at step 3100-U3/4-14, the program ends after successful completion.

Figure 19:
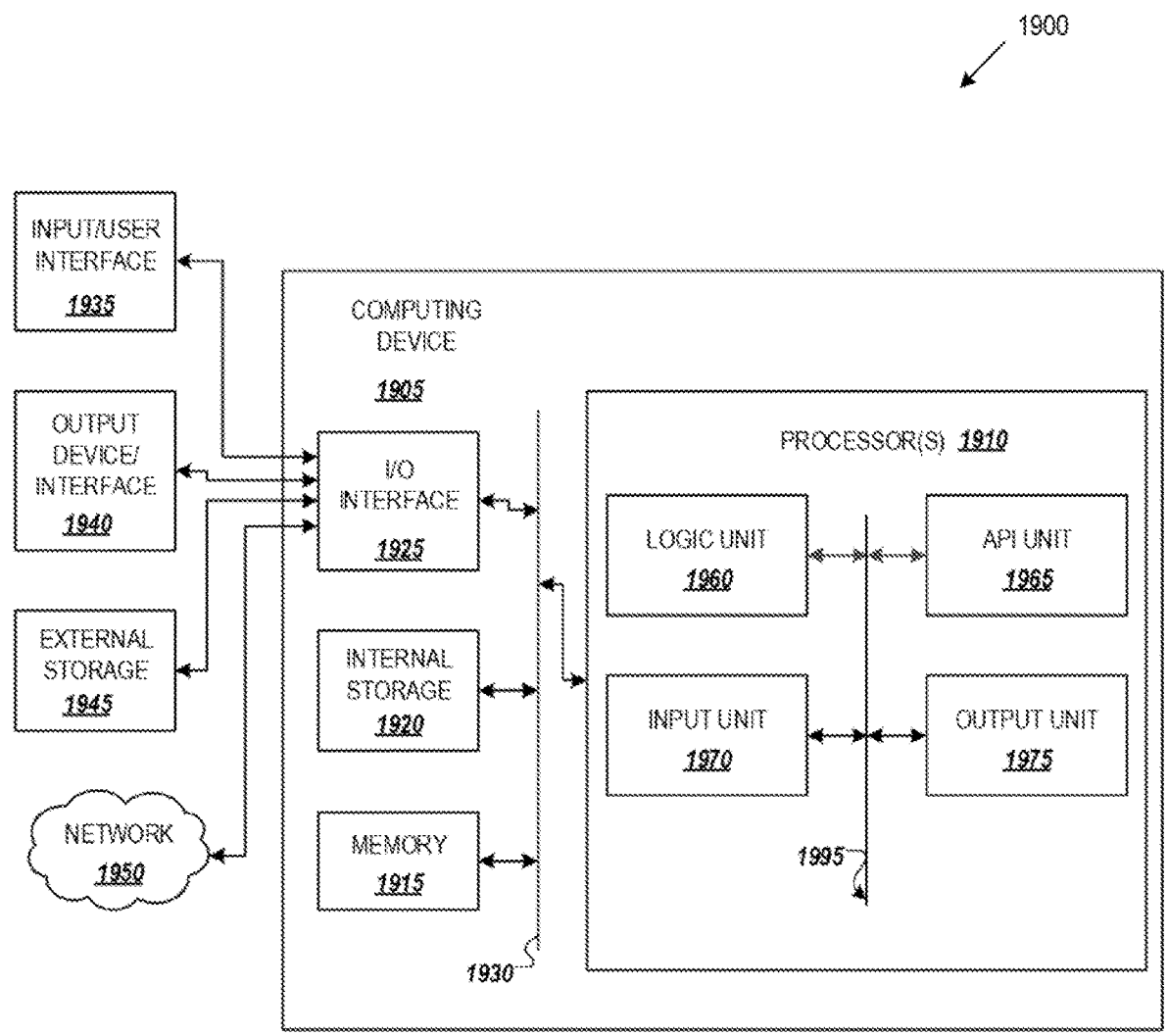
FIG. 19 illustrates an example computing environment with an example computer device suitable for use in some example implementations.

FIG. 19 illustrates an example computing environment with an example computer device suitable for use in some example implementations, such as BaaS management server 3000 as illustrated in FIG. 1. Computing device 1905 in computing environment 1900 can include one or more processing units, cores, or processors 1919, memory 1915 (e.g., RAM, ROM, and/or the like), internal storage 1920 (e.g., magnetic, optical, solid-state storage, and/or organic), and/or I/O interface 1925, any of which can be coupled on a communication mechanism or bus 1930 for communicating information or embedded in the computing device 1905. I/O interface 1925 is also configured to receive images from cameras or provide images to projectors or displays, depending on the desired implementation.

Computing device 1905 can be communicatively coupled to input/user interface 1935 and output device/interface 1940. Either one or both of input/user interface 1935 and output device/interface 1940 can be a wired or wireless interface and can be detachable. Input/user interface 1935 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1940 may include a display, television, monitor, printer, speaker, braille, or the like. In some example implementations, input/user interface 1935 and output device/interface 1940 can be embedded with or physically coupled to the computing device 1905. In other example implementations, other computing devices may function as or provide the functions of input/user interface 1935 and output device/interface 1940 for a computing device 1905.

Examples of computing device 1905 may include highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 1905 can be communicatively coupled (e.g., via I/O interface 1925) to external storage 1945 and network 1950 for communicating with any number of networked components, devices, and systems, including one or more computing devices of the same or different configuration. Computing device 1905 or any connected computing device can be functioning as, providing services of, or referred to as a server, client, thin server, general machine, special-purpose machine, or another label.

I/O interface 1925 can include wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1900. Network 1950 can be any network or combination of networks (e.g., the Internet, local area network, wide area network, a telephonic network, a cellular network, satellite network, and the like).

Computing device 1905 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computing device 1905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 1910 can execute under any operating system (OS) (not shown), in a native or virtual environment. One or more applications can be deployed that include logic unit 1960, application programming interface (API) unit 1965, input unit 1970, output unit 1975, and inter-unit communication mechanism 1995 for the different units to communicate with each other, with the OS, and with other applications (not shown). The described units and elements can be varied in design, function, configuration, or implementation and are not limited to the descriptions provided. Processor(s) 1910 can be in the form of hardware processors such as central processing units (CPUs) or in a combination of hardware and software units.

In some example implementations, when information or an execution instruction is received by API unit 1965, it may be communicated to one or more other units (e.g., logic unit 1960, input unit 1970, output unit 1975). In some instances, logic unit 1960 may be configured to control the information flow among the units and direct the services provided by API unit 1965, input unit 1970, output unit 1975, in some example implementations described above. For example, the flow of one or more processes or implementations may be controlled by logic unit 1960 alone or in conjunction with API unit 1965. The input unit 1970 may be configured to obtain input for the calculations described in the example implementations, and the output unit 1975 may be configured to provide output based on the calculations described in example implementations.

Processor(s) 1910 can be configured to execute a method or computer instructions that can involve providing to a first interface in a network, a selection of data to be backed up from a primary site to a remote site; estimating required resources for executing a backup of the data from the primary site to the remote site, as described with reference to FIG. 5 and FIG. 6; for a plurality of time windows, using network information to obtain a network resource utilization estimate, as described with reference to FIG. 17; using the estimated required resources and the network resource utilization estimate to determine, among the plurality of time windows, one or more time windows in which network resources are insufficient to execute the backup, as described with reference to FIG. 4; and providing to a second interface in the network a selection option for the plurality of time windows, excluding, at the least, the one or more time windows, thereby preventing an SLA violation when executing the backup, as described with reference to FIG. 5 and FIG. 6.

Processor(s) 1910 can further be configured to execute a method or computer instructions that can involve using required resources and the network resource utilization estimate to assign a score to each selection option; deriving the score, which is indicative of the required resources, from a base score that is stored in a score policy table shown in FIG. 1; displaying the score, e.g., together with availability of a discount and/or an indication of the presence of the SLA violation risk to discourage a user from selecting a window likely to cause an SLA violation, as described with reference to FIG. 4; pre-selecting a time window associated with the highest score, as discussed with reference to FIG. 5 and FIG. 6; estimating the required resources comprises using a size of a volume associated with the selection for the data, a storage class throughput, and an interval between jobs to estimate an amount of the data that is to be backed up, as discussed with reference to FIG. 5, FIG. 9, and FIG. 10; estimating the required resources comprises using a service level of the backup and historical data, as discussed with reference to FIG. 6.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
   providing to a first interface in a network, a selection of data to be backed up from a primary site to a remote site;
   estimating required resources for executing a backup of the data from the primary site to the remote site;
   for a plurality of time windows, using network information to obtain a network resource utilization estimate;
   using the estimated required resources and the network resource utilization estimate to determine, among the plurality of time windows, one or more time windows in which network resources are insufficient to execute the backup; and
   providing to a second interface in the network a selection option for the plurality of time windows, excluding, at the least, the one or more time windows, thereby preventing a Service Level Agreement (SLA) violation when executing the backup;
   wherein the network information comprises a current throughput obtained from a storage system.

2. The method of claim 1, further comprising using the required resources and the network resource utilization estimate to assign a score to each selection option.

3. The method of claim 2, further comprising, for each of the plurality of time windows, determining an SLA violation risk.

4. The method of claim 3, wherein the second interface is configured to display the score and further configured to indicate the presence of the SLA violation risk to discourage a selection of selection options that are likely to cause an SLA violation.

5. The method of claim 2, wherein the second interface is configured to display, for each selection option, an indication about an availability of a discount.

6. The method of claim 2, wherein assigning the score comprises referencing a score policy table that comprises a base score, the base score being used to derive the score and being indicative of the required resources.

7. The method of claim 2, wherein the second interface is configured to pre-select, among the plurality of time windows, a time window associated with a highest score.

8. The method of claim 1, wherein the estimating the required resources comprises using a size of a volume associated with the selection for the data, a storage class throughput, and an interval between jobs to estimate an amount of the data that is to be backed up.

9. The method of claim 1, wherein the estimating the required resources comprises using a service level of the backup and historical data.

10. A non-transitory computer-readable medium for storing instructions for executing a process, the instructions comprising:
    providing to a first interface in a network a selection of data to be backed up from a primary site to a remote site;
    estimating required resources for executing a backup of the data from the primary site to the remote site;
    for a plurality of time windows, using network information to obtain a network resource utilization estimate;
    using the estimated required resources and the network resource utilization estimate to determine, among the plurality of time windows, one or more time windows in which network resources are insufficient to execute the backup; and
    providing to a second interface in the network a selection option for the plurality of time windows, excluding, at the least, the one or more time windows, thereby preventing a Service Level Agreement (SLA) violation when executing the backup;
    wherein the network information comprises a current throughput obtained from a storage system.

11. The non-transitory computer-readable medium of claim 10, further comprising using the required resources and the network resource utilization estimate to assign a score to each selection option.

12. The non-transitory computer-readable medium of claim 11, further comprising, for each of the plurality of time windows, determining an SLA violation risk.

13. The non-transitory computer-readable medium of claim 12, wherein the second interface is configured to display the score and further configured to indicate the presence of the SLA violation risk to discourage a selection of selection options that are likely to cause an SLA violation.

14. The non-transitory computer-readable medium of claim 11, wherein assigning the score comprises referencing a score policy table that comprises a base score, the base score being used to derive the score and being indicative of the required resources.

15. The non-transitory computer-readable medium of claim 10, wherein the second interface is configured to pre-select, among the plurality of time windows, a time window associated with a highest score.

16. The non-transitory computer-readable medium of claim 10, wherein the second interface is configured to display, for each selection option, an indication about an availability of a discount.

17. The non-transitory computer-readable medium of claim 10, wherein the estimating the required resources comprises using a size of a volume associated with the selection for the data, a storage class throughput, and an interval between jobs to estimate an amount of the data that is to be backed up.

18. The non-transitory computer-readable medium of claim 10, wherein the estimating the required resources comprises using a service level of the backup and historical data.

\* \* \* \* \*